Feb. 9, 1937. P. DE LACY-MULHALL 2,070,089
IRRIGATION SYSTEM
Original Filed March 21, 1932  3 Sheets-Sheet 2
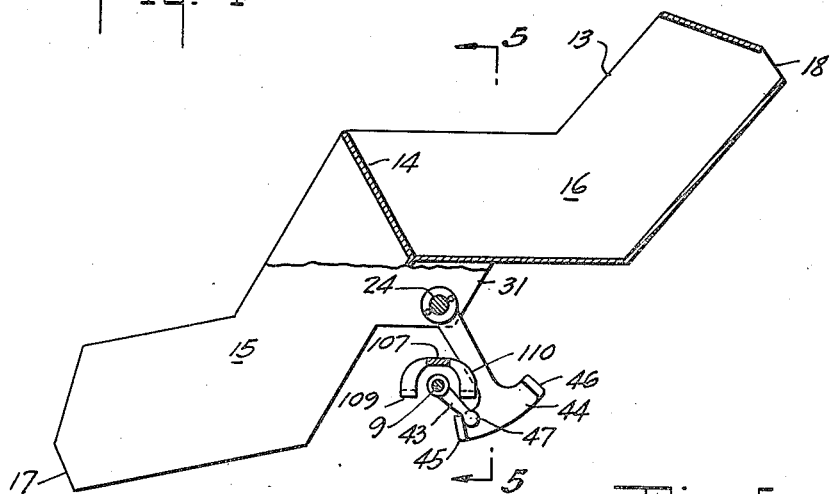
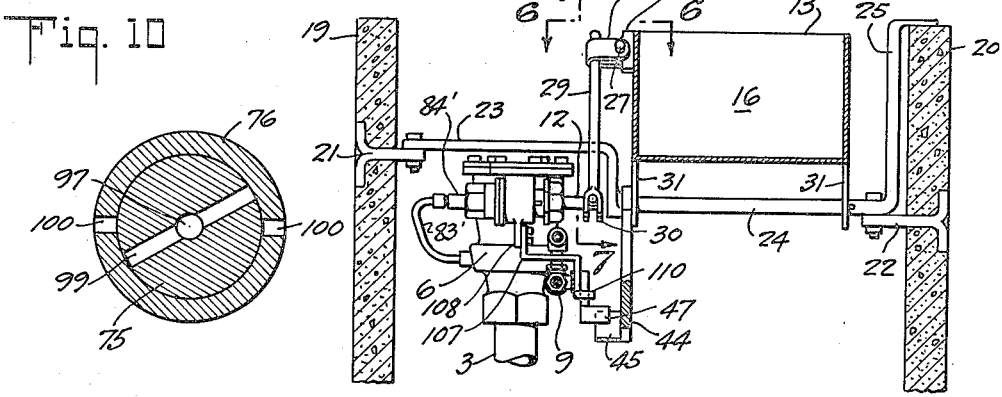
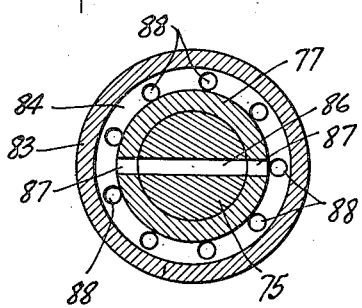
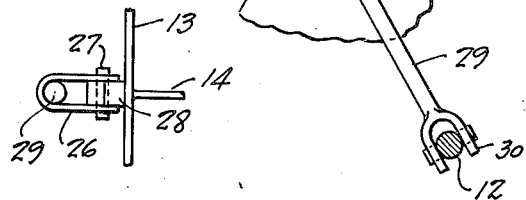
INVENTOR
Patrick DeLacy-Mulhall
BY John Flam
ATTORNEY Feb. 9, 1937.  P. DE LACY-MULHALL  2,070,089
IRRIGATION SYSTEM
Original Filed March 21, 1932  3 Sheets-Sheet 3
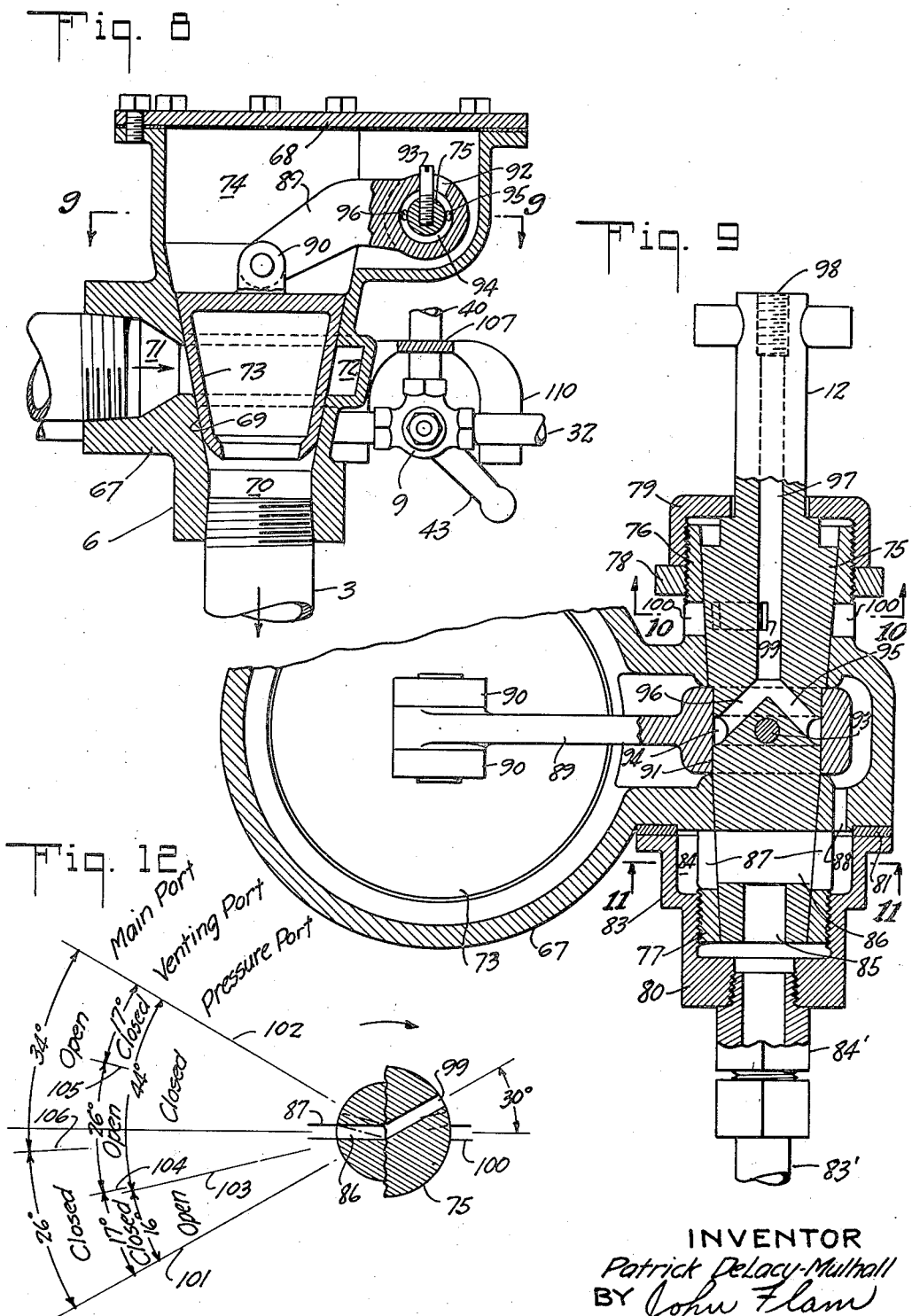
INVENTOR
Patrick Delacy-Mulhall
BY John Flam
ATTORNEY Patented Feb. 9, 1937

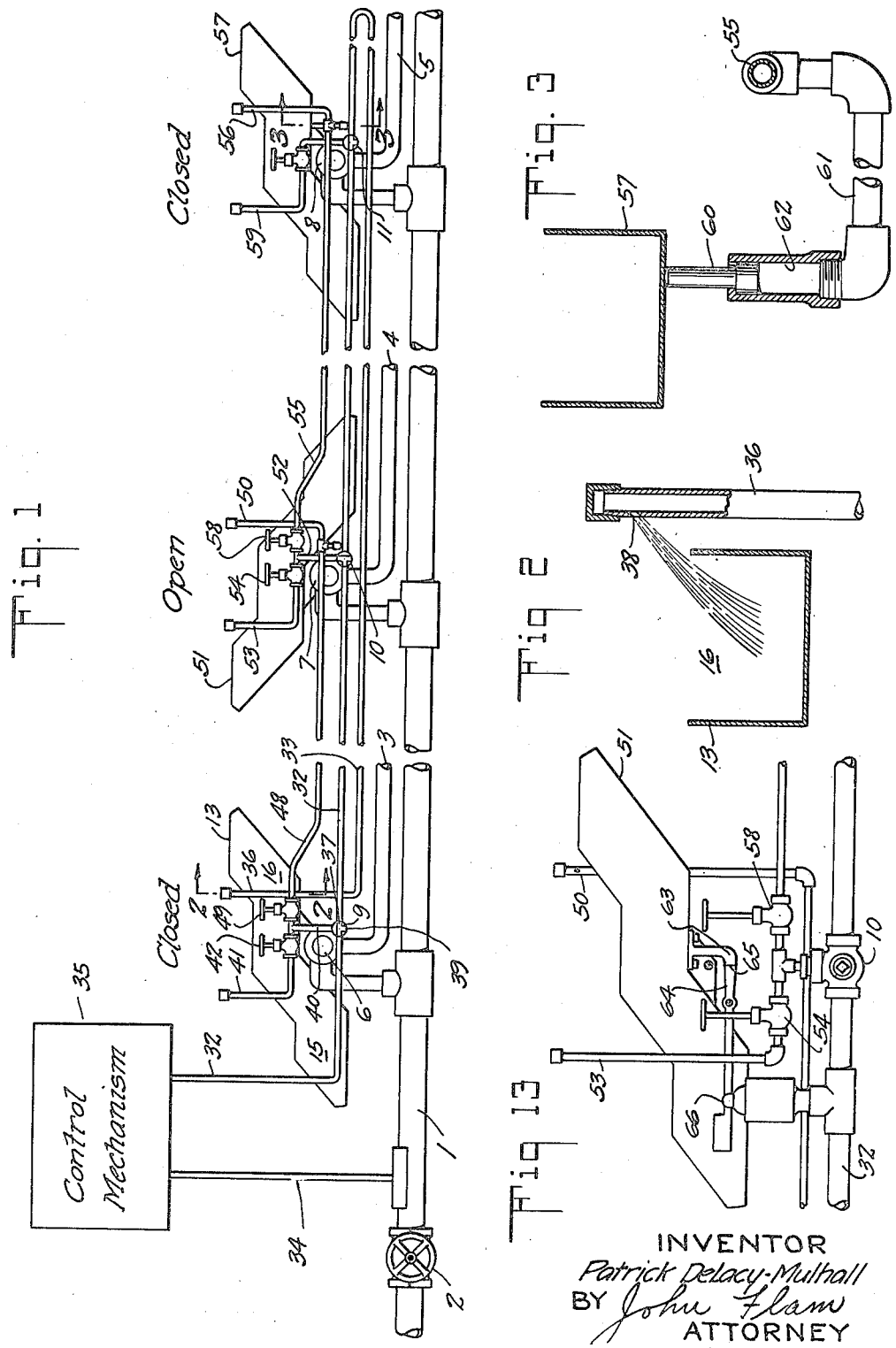

2,070,089

UNITED STATES PATENT OFFICE 2,070,089

IRRIGATION SYSTEM

Patrick De Lacy-Mulhall, Los Angeles, Calif.

Application March 21, 1932, Serial No. 600,136
Renewed July 8, 1936

3 Claims. (Cl. 277—31)

This invention relates to a system for supplying water for irrigation purposes.

In such systems, the soil can be irrigated from water outlets either above or below the ground. It is convenient, when large areas are to be irrigated, to irrigate smaller sections of the area at a time, thereby ensuring against any excessive rate of water consumption with its attendant difficulties.

It is one of the objects of my invention to make it possible to cause a cyclic operation of such a system so that each section or "block" is irrigated successively. This can be accomplished by the aid of which the sequence of activity for each section or block of the irrigation system is automatically maintained. The initiation of the control can be either by manual or automatic means.

It is still another object of my invention to provide a water distribution valve that is easy to manipulate and that ensures perfect closure, while the opening operation is secured without the exercise of an unusual force.

I am enabled to accomplish this result by providing a valve of novel form, in which the pressure of the water serves selectively either to keep the valve tightly closed, or to urge the valve open. Selection of the direction in which this pressure can be effective is controlled by a rotatable member actuated either manually or automatically, or by power, such as hydraulic or electric means.

My invention possesses many other advantages, and has other objects which may be made more easily apparent from a consideration of several embodiments of my invention. For this purpose I have shown a few forms in the drawings accompanying and forming part of the present specification. I shall now proceed to describe these forms in detail, which illustrate the general principles of my invention; but it is to be understood that this detailed description is not to be taken in a limiting sense, since the scope of my invention is best defined by the appended claims.

Referring to the drawings:

Figure 1 is a diagram showing an irrigation system embodying my invention;

Fig. 2 is a detail section taken along plane 2—2 of Fig. 1;

Fig. 3 is another detail section taken along the plane 3—3 of Fig. 1;

Fig. 4 is an enlarged detail view of one of the buckets or receptacles with some of its associated parts;

Fig. 5 is a sectional view of the installation of Fig. 1, taken along plane 5—5 of Fig. 4;

Fig. 6 is a detail view taken from the plane 6—6 of Fig. 5;

Fig. 7 is a detail view taken along plane 7—7 of Fig. 5;

Fig. 8 is a vertical sectional view of the control valve used in connection with my invention;

Fig. 9 is a detail section of the valve taken along plane 9—9 of Fig. 8;

Figs. 10 and 11 are detail sections taken along the planes 10—10 and 11—11 respectively of Fig. 9;

Fig. 12 is a diagram showing the sequence of operation of the valve; and

Fig. 13 is a fragmentary view illustrating a slightly modified form of the invention.

In Figs. 1, 2 and 3 there is shown an irrigation system having an indefinite number of blocks or sections. The system is most conveniently arranged below the ground level, and the water distributed thereby can optionally be discharged either below the ground or carried to outlets above ground. Thus, for example, there is a main pipe 1 which is supplied with water under pressure from an appropriate source or reservoir, and which can be controlled by a main valve 2. This pipe 1 is provided with a series of branches such as 3, 4 and 5 controlled respectively by the control valves 6, 7 and 8, spaced along the length of pipe 1 and corresponding to the blocks or sections under control.

During normal operation, the valve 2 is kept continuously open. Valves 6, 7 and 8 are, however, so controlled that they are opened in succession, and in a definite timed cycle. Although only three blocks are shown in the present instance, any number of them may be provided as indicated by the breaks in the main pipe 1. Furthermore, it is to be understood that the branches 3, 4, and 5 lead to appropriate sets of distributing nozzles or jets either below or above the ground.

In isolated places especially, it is advantageous so to arrange matters that the irrigation system performs automatically, and without the necessity of any complicated apparatus for performing the timing function. In this instance, the timing functions are performed by intervals required for an accumulation of a definite amount of water in a measuring device, the period of accumulation providing the timing functions, and the weight of the water providing the force for performing the mechanical control movements.

In order to accomplish this result, each of the valves 6, 7 and 8 are arranged to be controlled by its associated pilot valve 9, 10 or 11, in a manner to be described.

Before describing in detail how these pilot valves operate to perform this function, the mechanical arrangement for directly operating the valves 6, 7 and 8 will be disclosed. Since this mechanical means is the same for all of the valves only one of them, such as 6 will be described in detail.

As shown most clearly in Figs. 5 and 9, this valve is provided with an operating shaft or plug 12, which upon rotation through a definite angle, such as sixty degrees, will cause the valve to move to its fully open or fully closed position. In the position shown in Fig. 1, valve 6 is closed. By rotating the element 12 in a clockwise direction as viewed in Fig. 1, the valve 6 can be opened and the associated block irrigated through the pipe 3, because valve 6 controls admission of water to branch 3.

To accomplish this rotary motion of element 12, use is made of the weight of water accumulating in a receptacle or bucket 13. This bucket 13 (Figs. 1, 4) is mechanically connected to swing or tilt about the axis of member 12 in either direction.

As shown most clearly in Fig. 4, this bucket has a central partition 14 forming the two compartments 15 and 16 with outlet spouts 17 and 18. In the position shown in Figs. 1 and 4, the compartment 15 is in water discharging position, and compartment 16 is in water receiving position. When a sufficient amount of water accumulates in the compartment 16, the bucket 13 is tilted by the weight of the water, and in tilting will rotate the member 12 to open the valve 6. The mechanical connection between the bucket 13 and the member 12 is clearly disclosed in Fig. 5. In this figure there are indicated walls 19 and 20, forming a trough which may be below the level of the ground for housing the control equipment. These walls can be made of concrete or similar material. Embedded in each of the walls are supporting ledges 21 and 22, which serve to support the transverse bar 23. To this bar is joined the stationary shaft 24 upon which the bucket 13 is pivoted, as by the aid of depending ears or lugs 25. Shaft 24 can have an extension 31 engaging the top of the wall 20 if desired. Arranged near the top edge of the bucket and opposite the partition 14 is a U-shaped retaining member 26 (Figs. 5, 6 and 7) pivotally supported on a post 27 passing through the boss 28 fastened to the bucket. Extending between the legs of this U-shaped member 26 is a rod 29 having clevis 30 at its end engaging the T-head of the member 12.

It is apparent that the elements 26, 29 and 30 form a universal coupling between rotatable member 12 and the bucket 13, permitting sidesway of this bucket as well as for slight irregularities of bucket movements. Furthermore, it is possible to disengage rod 29 from the bucket by lifting clevis 26, and to enable the valve 6 to be operated manually by the aid of rod 29, or other mechanical means in place of the weighted bucket.

It is apparent from the description as thus far set forth that rotatable member 12 is mechanically connected to the bucket 13 to operate valve 6. When water is allowed to flow into compartment 16 of bucket 13 when the bucket is in the position shown in the left hand block of Fig. 1, upon sufficient accummulation of water, the bucket 13 will tilt in a clockwise direction. As soon as the bucket tilts the water is discharged through the spout 18 and the bucket will stay in the tilted position until such time as water is fed to the compartment 15, sufficient to overbalance the bucket and cause it to rotate in a counterclockwise direction, to close the valve. The distribution of the water to the buckets at the several blocks is arranged in timed relationship, so that after valve 6 is opened, the timing function is initiated for the bucket at the succeeding block, water being fed to the right hand compartment of the bucket in the succeeding block. This system contemplates the use of a pilot pipe 32 and a return pipe 33. The pilot valves 9, 10 and 11 are disposed in the pipe 32 and are respectively adjacent their respective control valves 6, 7 and 8. The water from this pilot line 32 can be derived from a branch 34 from main pipe 1, and leading to a control mechanism 35, from which the pilot pipe 32 extends. This control mechanism may be either automatic or manual. If manual, the control mechanism may comprise merely a valve controlling the passage of water from pipe 34 to pipe 32. If automatic, the opening of this valve can be controlled by devices responsive to humidity or temperature conditions or time or any combinations thereof for opening the valve between pipe 34 and pipe 32.

At any rate, when passage of water is permitted between pipe 34 and pipe 32, and assuming that all of the control valves 6, 7 and 8 are closed, the first action is the initiation of the operation of valve 6 to open it. Thus water is allowed to flow through all of the pilot valves such as 9, 10, and 11, and then back through the pipe 33 to a primer outlet 36. Each of the plugs of pilot valves 9, 10 and 11 is arranged for a ninety degree movement, and has two positions. When the corresponding control valve 6 is closed, the position is such that passage of water through pipe 32 is not impeded, as by aid of the through aperture 37. However, in an open block, where the control valve is open, such as illustrated in Fig. 1, the passage of water beyond this open position is stopped and instead the water is shunted through other passages which will later be described. In this case, passage 37 is crosswise of pipe 32 and interrupts the flow of water to the right of valve 10.

For the present it is sufficient to note that when the system is started, all the pilot valves 9, 10, 11, et cetera, are in a position to permit water to flow through the entire length of pipe 32 and back through pipe 33 to the outlet 36. The water flows through this outlet 36 and empties into compartment 16 of bucket 13. After a short interval, the bucket 13 tips toward the right, opening valve 6 and causing water to be fed through branch 3 to the irrigation nozzles or jets of the first block.

At the same time, the pilot valve 9 is turned through an appropriate angle, shown as 90 degrees in this instance, to shut off the flow of water through pipe 32 beyond the first block, thereby stopping the flow of water through outlet 36. Thus the flow of water to compartment 16 is interrupted as soon as the control function of this compartment is completed.

The outlet arrangement 36 is illustrated more particularly in Fig. 2. It is preferably so arranged that water leaking from this outlet will not find its way into the bucket 13. To accomplish this result, the nozzle is formed as a downwardly directed opening 38, the pressure of the water causes it to extend laterally in the form of a jet into the bucket 13. As soon as the pilot valve 9 closes, any water dripping through the opening 38 will simply flow by gravity vertically downward along the nozzle 36 and will not reach the bucket 13.

In this way it is assured that leakage will not affect the proper timing of the system, as such leaks would not develop sufficient pressure to cause the jet to extend to the bucket. Accuracy in timing is therefore assured, even if there should be some slight leaks through any of the main valves, pilot valves, or pipes.

As soon as bucket 13 tilts to open valve 6, another passageway 39 in pilot valve 9 becomes active to divert the water through pipe 32 into a branch 40. This passageway leads to the through port 37, thereby forming with the upper half of this port, a continuous passage between the left hand portion of pipe 32 and branch 40. Extending from this branch is an outlet 41 similar to outlet 36, but arranged to discharge water into the left hand compartment 15 of the bucket 13. Water can now be discharged into this compartment. As soon as sufficient water accumulates in compartment 15, the weight of it tilts the bucket 13 back to the position shown in Fig. 1 and valve 6 is closed. Accordingly, it is apparent that the period of accumulation of water in compartment 15 determines the period of irrigation of the first block. This period can be accurately adjusted, as by the aid of a hand control valve 42. Upon closing of the valve 6, the pilot valve 9 is again in a position to permit the passage of water beyond it through the pipe 32.

The control of the pilot valve 9 simultaneously with the tilting of the bucket 13 is accomplished by mechanism shown most clearly in Figs. 4 and 5. The pilot valve 9 has an actuating arm or lever 43. This actuating arm is moved by the bucket 13 between its two positions, as by the aid of a segment arm 44 joined to one of the ears 31 of the bucket. This arm 44, for example, may have a pair of upstanding bosses 45 and 46 engaging the boss 47 of lever 43. In the position of Fig. 4, the lever 43 is held by projection 45 to place passageway 37 in alinement with pipe 32. When the bucket tilts in a clockwise direction, the opposite projection 46 engages boss 47 and moves lever 43 in a clockwise direction so as to place passageway 37 vertical, and the communicating passageway 39 horizontal, for completing the connection between pipe 32 and extension 40. By appropriate frictional or gravity means, lever 43 is maintained against movement until positively actuated by the arm 44. It is furthermore, apparent that upon counterclockwise movement of bucket 13, lever 43 will be moved in a counterclockwise direction to restore the pilot valve 9 to the position of Fig. 1.

During the period of time that valve 6 is open, that is when bucket 13 has been tilted in a clockwise direction, water passes not only through the timing outlet 41, but also passes through a branch 48, connecting to branch 49. The rate of flow through this branch can be controlled by a manually set valve 49. Branch 48 leads to an outlet 50 in the succeeding block, which discharges water to the right hand compartment of the corresponding bucket 51. Thus by the time compartment 15 at the first block accumulates sufficient water to cause closure of valve 6, the right hand compartment 16 of bucket 51 has also accumulated enough water to tilt bucket 51 to the position shown, that is, valve 7 is opened. This opening, however, is delayed by the timing action of the flow of water into the right hand compartment of bucket 51 so that valve 7 does not open until or near the time when valve 6 closes, by the action of water in compartment 15.

The diagram of Fig. 1 illustrates the condition when bucket 51 has been tilted to open valve 7, and bucket 13 has been rotated in a counterclockwise direction to close valve 6.

Movement of the bucket 51 to the position shown, causes the pilot valve 10 to stop the flow of water through pipe 32 beyond valve 10, and to divert it instead through the branch 52. From branch 52 water is permitted to flow through the outlet 53 past an adjustable valve 54. This water accumulates in the left hand compartment of bucket 51, and after a definite interval, its weight causes the bucket 51 to rotate in a counterclockwise direction, to close the valve 7 as well as to operate pilot valve 10.

Similarly, water is also supplied during the period when control valve 7 is open, through a branch 55 which passes water to an outlet 56 associated with the succeeding block, which in this instance is the extreme right hand block illustrated. Here the same series of operations is performed. The bucket 57 in this last block is tilted due to the accumulation of water in its right hand compartment. The interval required to tilt this bucket 57 is determined by the setting of the valve 58 in the branch 55. When this bucket 57 tilts to open the valve 8, the pilot valve 11 is also moved to pass water to the opening 59. Water is then accumulated in the left hand compartment of bucket 57 after a predetermined interval, sufficient to tilt the bucket to the position shown, thereby closing the control valve 8 and restoring the pilot valve 11 to clear the pipe 32.

It is apparent that any number of succeeding blocks can be similarly controlled. Ultimately all of the valves 6, 7, 8, et cetera will have been opened in succession, and will have been closed in succession. If nothing further is done, the irrigation system begins on a new cycle, and control valve 6 is then again opened. However, the control mechanism 35 can be so arranged as to shut off the flow of water to pipe 32 upon the completion of one cycle, or it can be manually controlled to effect this result.

It is sometimes advisable to assure against the tilting of the buckets 51 and 57 as well as succeeding buckets of successive blocks, until the previous block has completed its cycle of irrigation. For this purpose, a sequel keeper may be used. Such a keeper is illustrated in connection with buckets 51 and 57, and its details are apparent from Fig. 3. The arrangement is such that while there is pressure in pipe 55 (corresponding to the open position of the preceding control valve), a plunger 60 is held by this water pressure against the bottom of the bucket, preventing it from tilting. This plunger is subjected to water pressure from a branch 61 leading from the pipe 55. This plunger 60 has a stroke long enough to permit complete tilting of bucket 57, when it drops by gravity into the cylinder 62 in response to failure of the fluid pressure in branch 55.

It is possible to utilize other forms of sequel keepers. Thus in Fig. 13, the bucket 51 is shown as having a stopping lug 63 cooperating with a pivoted lever 64 that is weighted normally to keep the detent 65 opposite the lug 63. While the preceding bucket, such as 13, is in open position, that is, when it is in the position corresponding to the open condition of valve 6, there is pressure in the pilot pipe 32. This is due to the fact that pilot valve 9 interrupts the flow of water to pipe 32 beyond an open control valve. However, as soon as bucket 13 returns to the closed position, this pressure in pipe 32 becomes active, and causes the operation of a popup plunger 66. This plunger pushes the lever 64 up, and removes detent 65 from the path of lug 63, permitting bucket 51 to tilt to open position.

A brief résumé of the operation of the system of Fig. 1 can now be set forth.

Normally all of the buckets of the entire system are in the closed position, such as the buckets 13 and 57. As soon as water is allowed to flow through pipe 32 through action of control 35, compartment 16 of the first bucket 13 is supplied with water through the outlet 36. After a definite interval, bucket 13 tilts to open valve 6. At the same time, pilot valve 9 is actuated to stop the flow of water through pipe 32 beyond this valve 9, thereby shutting off water through opening 36. Water, however, passes through the branch 40 and the left hand compartment 15 of bucket 13 is supplied with water, which, after a predetermined time, causes the closure of valve 6. At the same time water is supplied through pipe 48 to outlet 50 of the succeeding block. After a definite interval, bucket 51 is tilted to open valve 7. When this occurs water is diverted from pipe 32 by the pilot valve 10, and into branch 52. From this branch 52 water is supplied to outlet 53, supplying water to the left hand compartment of bucket 51, which is sufficient after a predetermined interval, to cause bucket 51 to tilt in a counterclockwise direction to close valve 7. Water is also passed to outlet 56, to cause opening of valve 8 after a predetermined interval.

When valve 7 closes water is again permitted to pass through pipe 32, and no water is passed through branch 52. Bucket 57 is permitted to tilt by the sequel keeper in a clockwise direction to open valve 8, where the same series of operations is performed.

It is to be noted also that as soon as each of the buckets returns to its closed position no further flow of water is permitted through the corresponding branch, such as 40, 52 or 59 so that the water used to operate a succeeding bucket to opening position is diverted as soon as there is sufficient accumulation for this purpose.

Any dripping or overlapping of operations of valve operations will not interfere with the timing due to the provisions shown in Fig. 2, preventing water from reaching the bucket unless it has sufficient force to project laterally from the nozzle.

In order that a system such as described may operate effectively, it is, of course, essential that the control valves 6, 7, 8, et cetera, be positively closed and opened. The force available for such positive opening and closing is limited by the weight of the water which is available to tilt the bucket structures. Accordingly, there has been devised a valve structure in which the tilting of the bucket serves mainly as a control for causing operation of the valve directly by the pressure of the medium which is controlled; in this instance, water.

The details of this novel valve construction are shown to best advantage in Figs. 8–12, inclusive. Thus, there is a main housing 67 formed with a cover 68. The lower portion of the body is formed with a tapered valve seat 69, the taper converging toward an outlet conduit or discharge 70, the axis of which is substantially in line with the axis of the tapered seat 69. Extending laterally of the tapered seat is an inlet conduit 71. This inlet conduit 71 communicates with an annular or ring chamber 72 formed intermediate of the valve seat 69. It is apparent that inlet pressure is effective in this annular chamber to urge the valve closure plug 73 toward opening position. This closure is arranged to fit closely in the tapered seat 69 and to interrupt communication between the ring chamber 72 and the outlet conduit 70.

As shown most clearly in Fig. 8, there is a chamber 74 above the plug closure 73. With the valve in the position shown, this chamber 74 is subjected to the pressure of the fluid, holding the closure 73 firmly in place and overpowering the pressure acting in the annular chamber 72, which urges the closure 73 toward opening position.

It is apparent that if the valve is to be opened, it is necessary to reduce the pressure in chamber 74; and this is accomplished by the aid of the rotatable member 12.

This rotatable member is disclosed most clearly in Fig. 9. It has a long tapered body or plug 75 through which various ports and passageways are formed for effecting control of the fluid pressures above the closure 73. This tapered member 75 is rotatably supported in a pair of bosses 76 and 77 formed integrally on opposite sides of the body 67. The axis of the member 12 and plug 75 is laterally displaced from the axis of closure 73. In order to hold member 75 against axial displacement, a nut 78 and cap 79 are threaded over the boss 76. Similarly, a cap 80 is threaded over the boss 77. If desired, a soft gasket 81, such as lead, can be interposed between flange 82 of the cap 80 and the body of the valve. This cap 80, furthermore, is provided with an annular wall 83 forming a chamber 84 around the boss 77 for a purpose to be hereinafter described.

In the position shown in Fig. 9, the fluid pressure in the inlet 71 is communicated to the chamber 74. This is effected by a connection 83' (Figs. 5 and 9) leading from the ring or annular chamber 72 and extending into the nipple connection 84' in the end of cap 80. From the cap 80, the fluid pressure extends through an axial aperture 85 in the bottom of member 75, and thence into the cross passage or slot 86 extending diametrically through the plug 75 (Figs. 9 and 11). This passage 86 is for this position in alinement with a pair of diametrically opposite slots 87 in the boss 77. These slots 87 serve to pass the fluid to the annular chamber 84. From this annular chamber 84 the fluid enters the main housing 67 to the chamber 74 by way of a number of ports or openings 88, nine being shown in this instance. These openings 88 establish connection between the annular chamber 84 and the chamber 74.

In order to relieve this pressure in chamber 74 to permit opening of the valve, venting ports and passageways are formed which are active upon a definite rotation of member 12. Furthermore, a mechanical connection is also provided between the valve closure 73 and the member 12 so that after this pressure is relieved in chamber 74, continued rotation of member 12 will mechanically lift the closure. This can be accomplished for example, by the aid of a crank or lever 89 pivotally joined to the ears or lugs 90 formed on top of the valve closure 73, and also pivoted on a cylindrical portion 91 of the plug 75. However, the arrangement is such that the mechanical connection is ineffective until member 12 rotates far enough to cause venting of the chamber 74. Therefore, a lost motion connection is provided between the lever 89 and member 75. This is shown most clearly in Fig. 8. The lever 89 has an oval slot 92 through which extends a post or pin 93 fastened to the plug 75 in a radial direction. Between the limits of motion determined by the extent of slot 92, the plug 75 can rotate without exerting a mechanical force on lever 89. In the closed position of the valve, pin 93 engages the left hand end of slot 92, as shown in Fig. 8. Plug 75 must be rotated in a clockwise direction by about 25 or 30 degrees before the right hand end of slot 92 is engaged by pin 93. The motion defined by the arcuate length of slot 92 is that required for performing the operation of venting chamber 74, in a manner to be described.

As shown most clearly in Fig. 8, that portion of slot 92 which is unoccupied by the pin 93 is open to chamber 74. It is through this portion of the slot that venting of the pressure in chamber 74 is effected. Thus cut in plug 75 is an annular groove 94 which is in communication with slot 92. From this groove can lead a pair of slanting apertures 95 and 96, communicating with an axial central aperture 97 in member 12. This aperture can be plugged at the upper end, as by a screw plug 98. In communication with axial aperture 97 is a diametric slot 99 (Figs. 9 and 10) which is normally out of register with a pair of slots 100 in the boss 76. However, upon continued rotation of member 12, it is apparent that slot or passage 99 will be alined with the slot 100 and will permit the fluid in chamber 74 to pass through slot 92, groove 94, passageways 95, 96, 97 and slots 99 and 100 to the atmosphere. At the same time this rotation of member 12 will destroy the alinement of the passageway 86 with slots 87, stopping the passage of fluid into chamber 74.

The cycle of operation of the valve can be best explained by the aid of Fig. 12. In that figure the legend "Main Port" refers to the main valve elements 69 and 73. The legend "Venting Port" refers to the ports 100 through which the chamber 74 can be vented. The legend "Pressure Port" refers to the ports 87 through which pressure is applied to chamber 74.

In the diagram of Fig. 12 the angle between lines 101 and 102 represents the angle of movement of plug 75 as provided by the tilting of the buckets. The angle between lines 101 and 103 represents the angle of motion during which pressure is applied to chamber 74 through ports 87, 88. Thus the pressure port is marked as open in this angle, and as closed in the angle of motion represented by the lines 103 and 102.

The venting port (that is, slots 100) is shown as closed between the angle of lines 101 and 104, which slightly overlaps the angle for which the pressure ports 87 are open. Therefore, it is seen that the venting port does not open until after the pressure port is closed. After the venting port opens, the fluid passes out through the ports 100 and continues to be open for an angle represented by lines 104 and 105. This angle is determined by appropriate design of the width of the slots 99 and 100. For the remainder of the angle of motion, that is, the angle between lines 105 and 102, the venting port is again closed. This is essential, because after the closure 73 is lifted from its seat 69, fluid can pass upwardly into chamber 74 from chamber 72, and would be wasted through the venting port.

The main port remains closed through a distance represented by the lost motion between slot 92 and pin 93. It is shown as the angle between lines 101 and 106. For the remainder of the motion the main valve is open.

It is apparent from the foregoing that before any mechanical force is imposed upon lever 89 by pin 93, the pressure above the closure 73 is reduced. After this venting takes place, the pressure of the fluid acting in chamber 72 assists in urging the closure 73 upwardly.

Although the angular extents of open and closed position of the various ports is indicated in Fig. 12, it is of course to be understood that other proportions of angular motions could be utilized. The important point is that by continued rotation of member 12, which requires only a small force, the valve can be opened without the necessity of overcoming any excessive fluid pressures.

The reverse movement, that is, closing movement of the main valve, is apparent from the foregoing. First of all the venting port is opened; then lever 89 is mechanically actuated by pin 93 toward closing position; then the venting port is reclosed, and the pressure port is soon thereafter opened to exert a closing and sealing pressure on closure 73.

In order to support the pilot pipe 32 conveniently, as well as the pilot valve 9, there is shown a bracket 107 (Figs. 4 and 5) fastened to a lug 108 formed on the outside of the valve body. This bracket has a horizontal extension through which the branch 40 extends, and to which the top of pilot valve 9 can be fastened. Leading downwardly from this horizontal extension a yoke can be provided having arms 109 and 110 imposing a definite mechanical limit to the movement of the pilot valve operating lever 43.

It is apparent from the foregoing that the control valves, such as 6, are moved to open and closed position with facility; and particularly by making use of opposing fluid pressures acting on closure 73, and controlled by rotation of member 12.

I claim:

1. In a valve, a valve body having a tapered valve seat leading to a discharge passage, said seat having an annular passage leading into it and connecting to an inlet passage, a tapered valve closure cooperating with the seat to control communication between the annular passage and the discharge passage, the taper being in such direction that the pressure of the fluid controlled by the valve is in a direction to urge the closure to opening position, means forming a chamber over the valve closure in which any fluid pressure urges the valve closure toward sealing position, and a rotatable control member accommodated by the valve body, said valve body and member having a plurality of cooperating sets of ports, adapted to be alined and out of alinement as said control member is rotated between its extreme positions, one set of ports controlling the admission of the fluid to the chamber, and another set of ports controlling the venting of the chamber, the ports being arranged in such manner that the admission ports are closed at substantially the same time as the venting ports open, and the venting ports are later then closed as the control member is further rotated.

2. In a valve, a valve body having a tapered valve seat leading to a discharge passage, said seat having an annular passage leading into it and connecting to an inlet passage, a tapered valve closure cooperating with the seat to control communication between the annular passage and the discharge passage, the taper being in such direction that the pressure of the fluid controlled by the valve is in a direction to urge the closure to opening position, means forming a chamber over the valve closure in which any fluid pressure urges the valve closure toward sealing position, a rotatable control member accommodated by the valve body, said valve body and member having a plurality of cooperating sets of ports, adapted to be alined and out of alinement as said control member is rotated between its extreme positions, one set of ports controlling the admission of the fluid to the chamber, and another set of ports controlling the venting of the chamber, and a connection between the closure and the control member, so constructed that this connection moves the closure to open position when the venting ports are open.

3. In a valve, a valve body having a tapered valve seat leading to a discharge passage, said seat having an annular passage leading into it and connecting to an inlet passage, a tapered valve closure cooperating with the seat to control communication between the annular passage and the discharge passage, the taper being in such direction that the pressure of the fluid controlled by the valve is in a direction to urge the closure to opening position, means forming a chamber over the valve closure in which any fluid pressure urges the valve closure toward sealing position, a rotatable control member accommodated by the valve body, said valve body and member having a plurality of cooperating sets of ports, adapted to be alined and out of alinement as said control member is rotated between its extreme positions, one set of ports controlling the admission of the fluid to the chamber, and another set of ports controlling the venting of the chamber, the ports being arranged in such manner that the admission ports are closed at substantially the same time as the venting ports open, and the venting ports are later then closed as the control member is further rotated, and a connection between the closure and the control member, so constructed that this connection moves the closure to open position when the venting ports are open.

PATRICK DE LACY-MULHALL.